US008294768B2

(12) United States Patent
Lee et al.

(10) Patent No.: US 8,294,768 B2
(45) Date of Patent: Oct. 23, 2012

(54) SYSTEM AND METHOD FOR MOTION DETECTION

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 409 days.

(21) Appl. No.: 12/650,562

(22) Filed: Dec. 31, 2009

(65) Prior Publication Data

US 2011/0122250 A1 May 26, 2011

(30) Foreign Application Priority Data

Nov. 23, 2009 (CN) .......................... 2009 1 0310241

(51) Int. Cl.
*H04N 7/18* (2006.01)
*G06K 9/00* (2006.01)

(52) U.S. Cl. ......................... 348/155; 348/143; 382/107

(58) Field of Classification Search .................. 382/107; 348/155, 143, 152; 375/345
See application file for complete search history.

(56) References Cited

U.S. PATENT DOCUMENTS

| | | | | |
|---|---|---|---|---|
| 5,937,079 | A * | 8/1999 | Franke | 382/103 |
| 6,049,619 | A * | 4/2000 | Anandan et al. | 382/107 |
| 7,251,346 | B2 * | 7/2007 | Higaki et al. | 382/106 |
| 7,362,911 | B1 * | 4/2008 | Frank | 382/260 |
| 7,477,785 | B2 * | 1/2009 | Reissman et al. | 382/221 |
| 7,599,546 | B2 * | 10/2009 | Kanai et al. | 382/154 |
| 2003/0035051 | A1 * | 2/2003 | Cho et al. | 348/169 |
| 2004/0061712 | A1 * | 4/2004 | Sogawa | 345/698 |
| 2006/0177097 | A1 * | 8/2006 | Fujimura et al. | 382/103 |
| 2006/0215903 | A1 * | 9/2006 | Nishiyama | 382/154 |

* cited by examiner

*Primary Examiner* — Joseph Avellino
*Assistant Examiner* — Aftab Nasir Khan
(74) *Attorney, Agent, or Firm* — Altis Law Group, Inc.

(57) ABSTRACT

A detection system detects moving objects in a scene by processing two consecutive images of the scene. The two consecutive images are captured by a pan-tilt-zoom (PTZ) camera and fed back to the system. The system obtains position information of the moving object in the scene, and adjusts parameters, such as a shoot angle, and a focal length of the PTZ camera, according to the position information of the moving object. Therefore, the PTZ camera can be aimed to follow the motion area and adjusted to optimum focal length.

12 Claims, 9 Drawing Sheets

SYSTEM AND METHOD FOR MOTION DETECTION

BACKGROUND

1. Technical Field

The present disclosure relates to security monitors, and particularly to a motion detection system and a method used for the system.

2. Description of Related Art

A pan-tilt-zoom (PTZ) camera may be employed in, for example, a bank vault or an enterprise confidential location for security. The PTZ camera shoots a plurality of consecutive images of a video field to detect suspected changes in the video field. An internal controller of the PTZ camera may drive the PTZ camera to pan, tilt, or zoom during image capture. Therefore, the PTZ camera can track moving objects in the video field. However, the PTZ camera cannot adjust parameters of the PTZ camera, such as a focal length and shooting angle, according to positions of the moving objects, and therefore, captured video of the moving objects may be out of focus.

DETAILED DESCRIPTION

Figure 1:
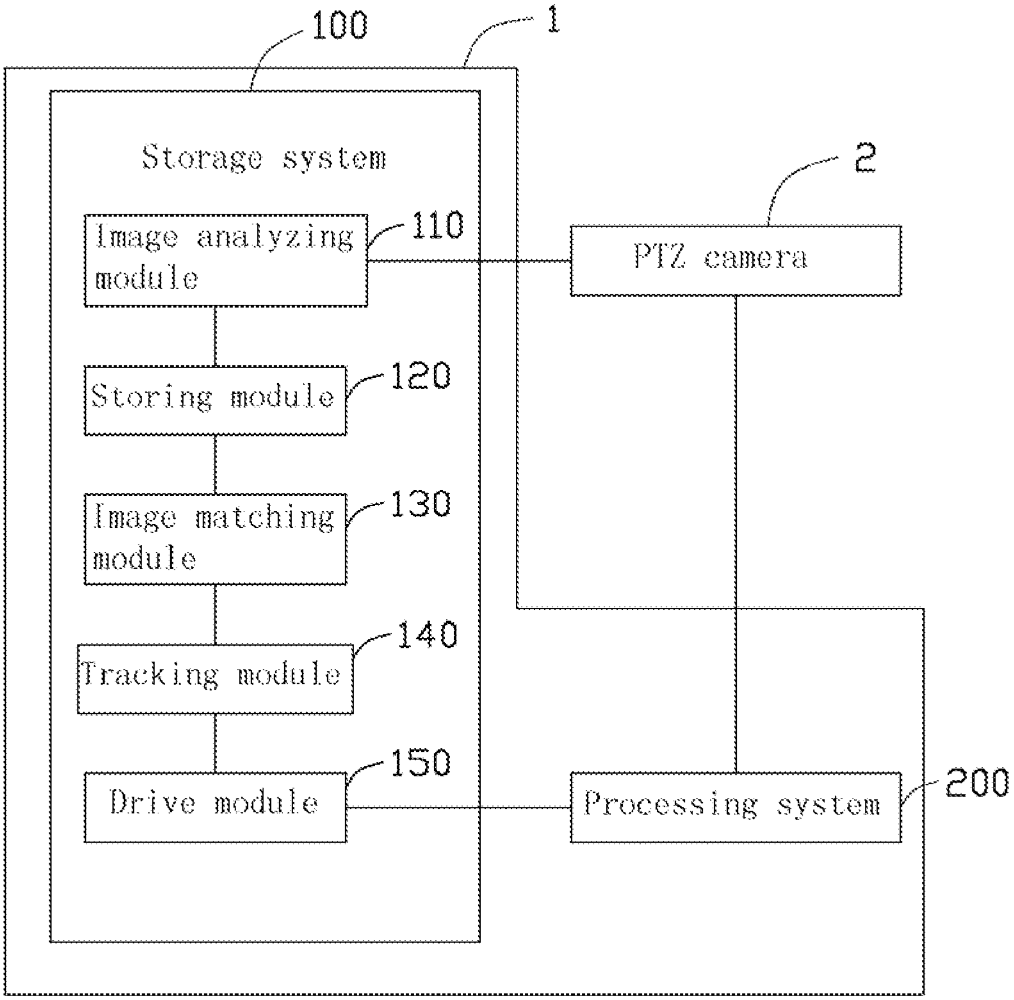
FIG. 1 is a block diagram of an exemplary embodiment of a motion detection system, the system includes a pan-tilt-zoom (PTZ) camera.

Referring to FIG. 1, an exemplary embodiment of a motion detection system 1 is used to adjust parameters of a pan-tilt-zoom (PTZ) camera 2. The PTZ camera 2 captures a plurality of consecutive images of a scene to perform security monitoring. The captured images are fed back to the system 1 for analysis. The system 1 detects displacement of objects in the scene according to the captured images, and adjusts parameters of the PTZ camera 2 according to a position of any displaced objects, allowing the PTZ camera 2 to shoot moving objects using optimum available shooting angles and focal lengths. The system 1 includes a storage system 100 and a processing system 200. The storage system 100 includes an image analyzing module 110, a storing module 120, an image matching module 130, a tracking module 140, and a drive module 150. The image analyzing module 110, storing module 120, image matching module 130, tracking module 140, and drive module 150 may include a plurality of computerized instructions and are executed by the processing system 200.

The image analyzing module 110 receives the captured consecutive images from the PTZ camera 2, and obtains characteristic values of the received images. The characteristic values of the received images may be obtained by a fast Fourier transform of geometric characteristics, color characteristics, and/or texture characteristics of the images.

The storing module 120 stores the characteristic values of the received images. In one exemplary embodiment, the storing module 120 may be a random access memory (RAM).

The image matching module 130 performs a fuzzy matching of two consecutive images of the received images, thereby to obtain a corresponding area of the two consecutive images. In this embodiment, the fuzzy matching is performed via an autocorrelation of the characteristic values of the two consecutive images. The two consecutive images are defined from a first image of the captured consecutive images on, such as first image and second image, second image and third image, and so on. Further details will be explained below. The autocorrelation is an image processing method of utilizing a correlation of characteristic values of the two consecutive images to find the corresponding area. The corresponding area is defined as an area appearing in both of the two consecutive images and having a correlation degree of the characteristic values being greater than a predetermined value, such as 80%. In other exemplary embodiments, the predetermined value of the corresponding area can be increased or decreased.

The tracking module 140 performs an accurate matching of the corresponding area in both of the two consecutive images, to obtain a motion area of the scene. The accurate matching is performed by comparing the characteristic values of the corresponding area in both of the two consecutive images. In one exemplary embodiment, an area in the corresponding area, with different characteristic values in the two consecutive images, is defined as the motion area. The tracking module 140 obtains position information of the motion area in response to the motion area being defined. In this embodiment, a planar coordinate system may be defined in the scene. A center of the scene may be an origin of the planar coordinate system. The position information of the motion area includes a coordinates range, indicating shortest and longest distances from the motion area to the center of the scene along a horizontal direction and an ordinate direction of the planar coordinate system, and a dimension of the motion area. For example, a coordinate range of (10 feet (ft)-20 ft, 30 ft-35 ft) indicates that a shortest distance and a longest distance from the motion area to the center of the scene along a horizontal direction are 10 ft and 20 ft respectively, a shortest distance and a longest distance from the motion area to the center of the scene along an ordinate direction are 30 ft and 35 ft respectively. Therefore, area of the motion area is (20 ft−10 ft)(35 ft−30 ft)=50 $ft^2$. Further details provided below.

The drive module 150 receives the position information of the motion area, and adjusts the parameters of the PTZ camera 2 accordingly. Therefore, the PTZ camera 2 can be aimed to follow the motion area and adjusted to optimum focal length.

Figure 2:
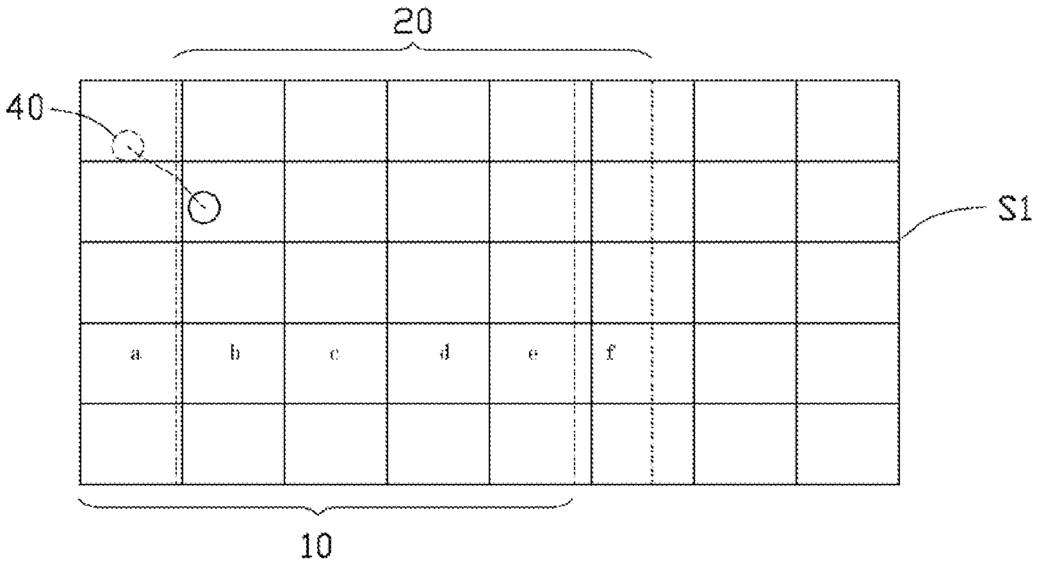
FIG. 2 is a sketch map showing consecutive images of a scene captured by the PTZ camera of FIG. 1, the consecutive images including a first image and a second image.
Figure 3:
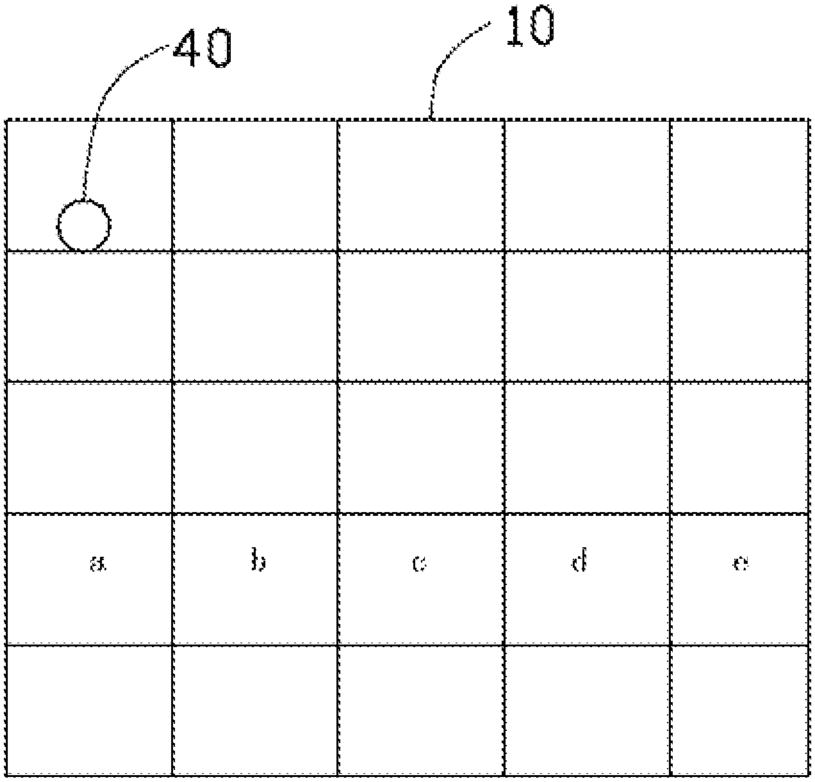
FIGS. 3 and 4 are sketch maps of the first and second images of FIG. 2, respectively.
Figure 4:
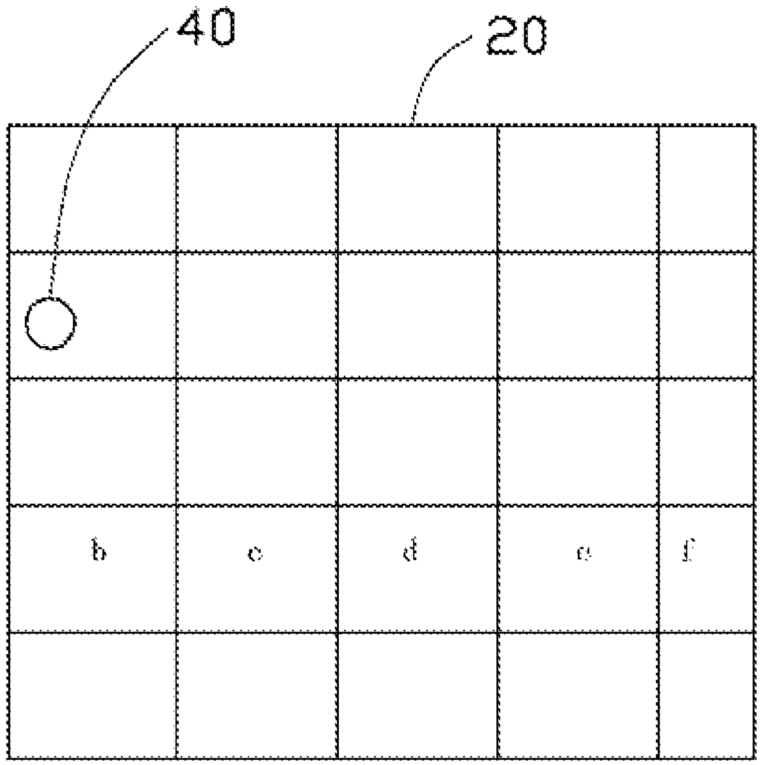

As an example, referring to FIGS. 2, 3, and 4, in use, the PTZ camera 2 may move and continuously capture images of a scene S1 having a moving object 40. As illustrated in FIG. 2, "a"-"f" indicates different areas of the scene S1. A first image 10 is captured by the PTZ camera 2 then a second image 20 and so on. Characteristic values of the first and second images 10 and 20 are calculated by the image analyzing module 110 and stored in the storing module 120.

Figure 5:
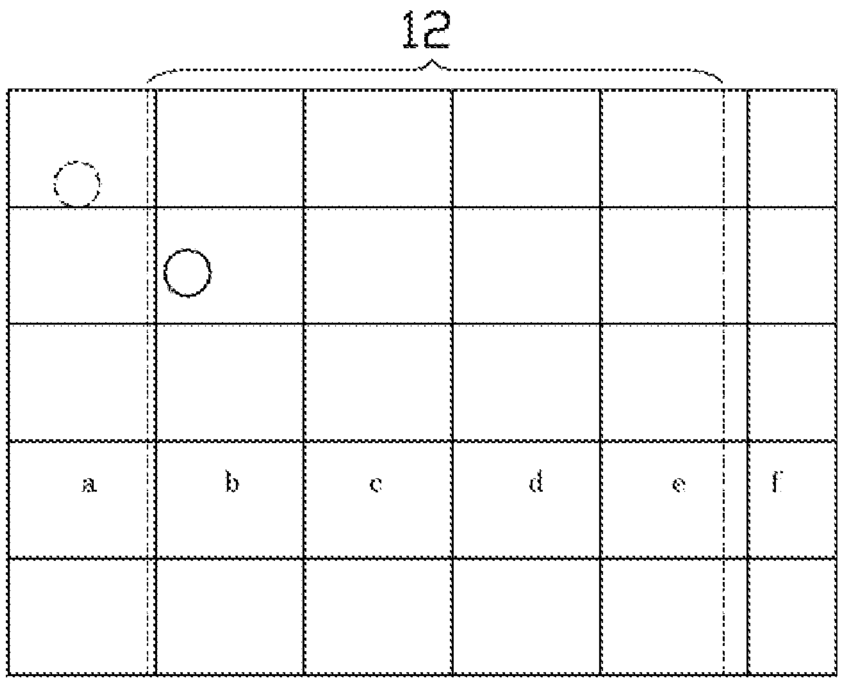
FIG. 5 is a sketch map of a corresponding area in both of the first and second images of FIGS. 3 and 4.

Referring to FIG. 5, the image matching module 130 obtains a corresponding area 12 via a fuzzy matching of the first and second images 10 and 20. That is to say, the corresponding area 12 appears in both of the first image 10 and the second image 20, and the correlation degree of the characteristic values of the corresponding area 12 in both of the first image 10 and the second image 20 is greater than a predetermined value, such as 85%.

Figure 6:
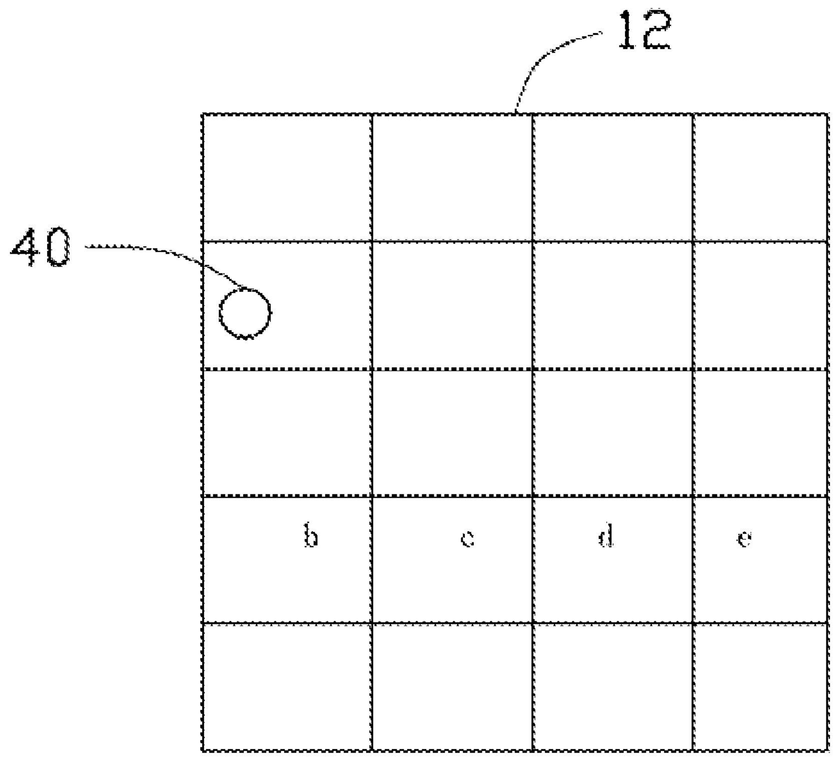
FIG. 6 is a sketch map of a moving object of the corresponding area of FIG. 5.

Referring to FIG. 6, the tracking module 140 determines a motion area of the moving object 40 by comparing the characteristic values of the corresponding area 12 in both of the first and second images 10 and 20. In detail, the moving object 40, which does not appear in the corresponding area 12 of the first image 10, appears in the corresponding area 12 of the second image 20. Therefore, an area with different characteristic values of the corresponding area 12 in the first and second images 10 and 20 is the motion area where the moving object 40 currently is located.

Figure 7:
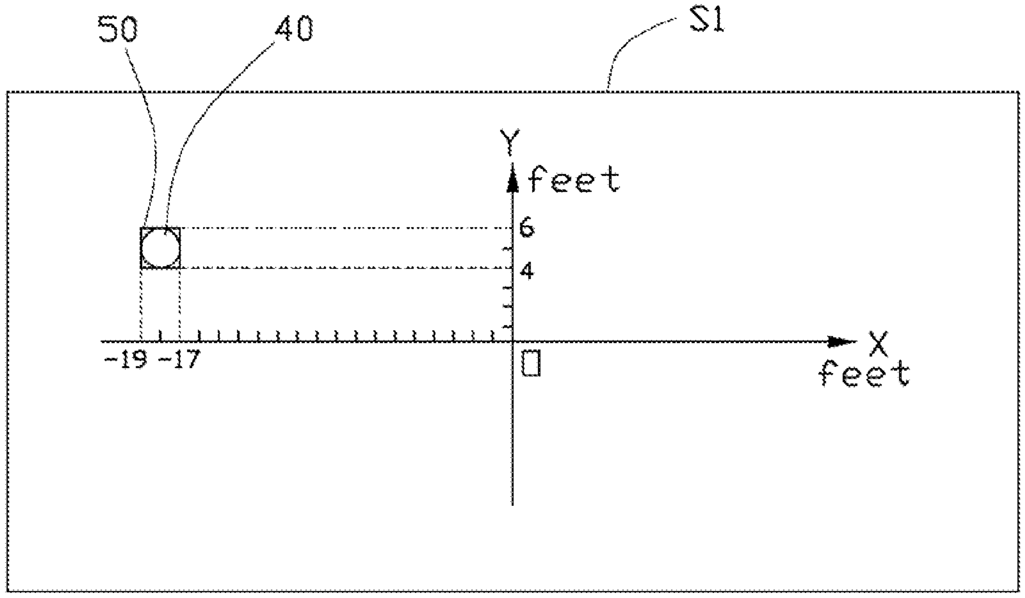
FIG. 7 is a sketch map of the scene of FIG. 2, with a coordinate system defined therein.

Referring to FIG. 7, a planar coordinate system XOY having a horizontal axis (X-axis) and an ordinate axis (Y-axis) is defined in the scene, with a center of the scene functioning as an origin O. The tracking module 140 calculates a coordinate range of the motion area in the scene. In this embodiment, the coordinate range of the motion area may include a horizontal coordinate range indicating a shortest distance and a longest distance between the motion area and the origin O along a positive direction and/or a negative direction of the X-axis. The coordinate range may also include an ordinate coordinate range indicating a shortest distance and a longest distance between the motion area and the origin O along a positive direction and/or a negative direction of the Y-axis. For example, if the shortest distance and the longest distance between the motion area and the center of the scene S1 along the opposite direction of the X-axis are 17 and 19 ft, the shortest distance and a longest distance between the motion area and the center of the scene S1 along the positive direction of the ordinary direction are 4 ft and 6 ft, respectively, the position information of the motion area is described as ((−19) ft-(−17)ft, 4 ft-6 ft). The position information also indicates that the area dimension of the motion area is 4 $ft^2$, which is obtained by multiplying (19-17)ft by (6-4)ft. As illustrated in FIG. 7, the motion area is the rectangular area 50 where the moving object 40 is located.

Figure 8:
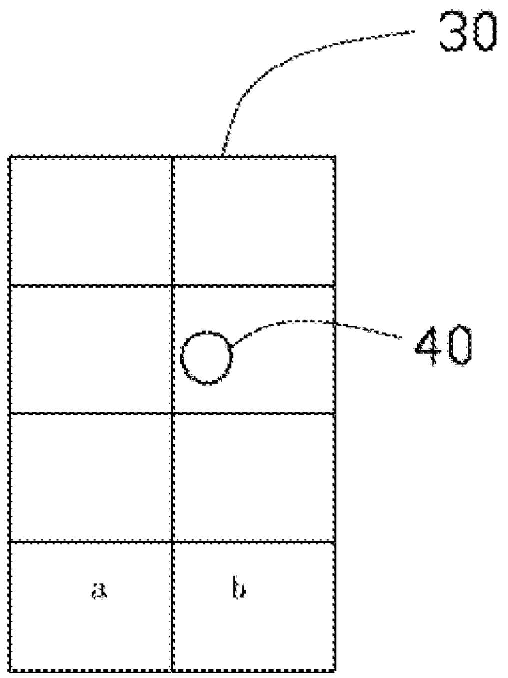
FIG. 8 is a sketch map of a captured image of the moving object by the PTZ camera of FIG. 1.

Referring to FIG. 8, the tracking module 140 transmits the position information of the motion area to the drive module 150. The drive module 150 then adjusts the shoot angle and focal length of the PTZ camera 2. Therefore, the PTZ camera 2 can be aimed to follow the motion area and adjusted to optimum focal length, and an image 30 of the moving object 40 is obtained. The image 30 may have a good quality.

Figure 9:
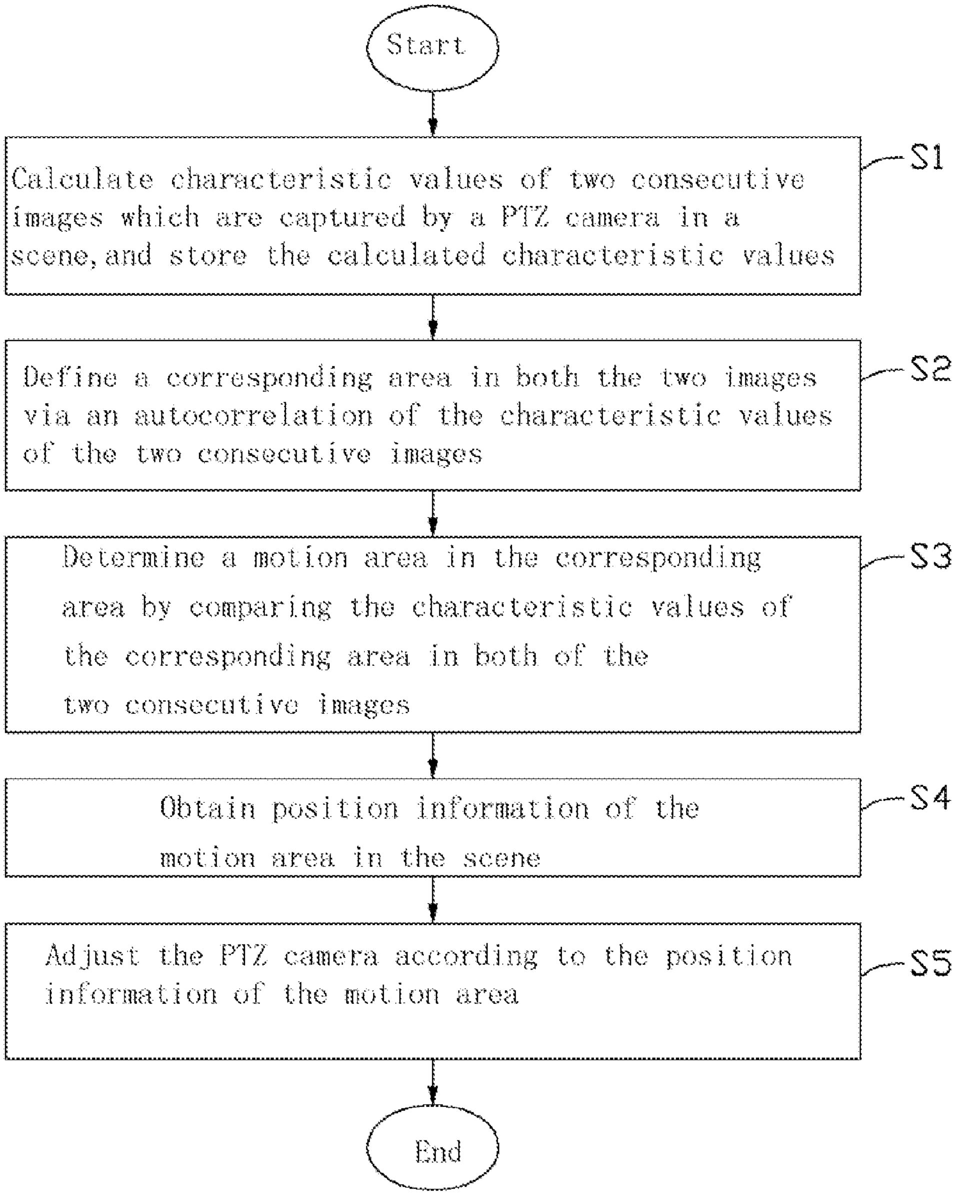
FIG. 9 is a flow diagram of an exemplary embodiment of a motion detection method.

Referring to FIG. 9, a motion detection method includes the following steps.

In step S1, the image analyzing module 110 receives a first image and a second images captured by the PTZ camera 2 in a scene, obtains characteristic values of the first and second images, and stores the obtained characteristic values in the storing module 120. The first and second images are consecutive images.

In step S2, the image matching module 130 defines a corresponding area in both the first and second images via fuzzy matching of the first and second images. In the exemplary embodiment, the corresponding area is defined via an autocorrelation of the characteristic values of the first and second images.

In step S3, the tracking module 140 determines a motion area in the corresponding area 12 via accurate matching of the corresponding area in both of the first and second images. That is to say, the tracking module 140 compares the characteristic values of the corresponding area in both of the first and second images to obtain the motion area. The motion area is an area with different characteristic values of the corresponding area in the first and second images.

In step S4, the tracking module 140 obtains position information of the motion area in the scene, and transmits the position information to the drive module 150.

In step S5, the drive module 150 adjusts the PTZ camera 2 according to the position information of the motion area, thereby to follow the motion area and adjusted to optimum focal length.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A motion detection system comprising:

a processing unit; and a storage system connected to the processing unit and storing a plurality of modules to be executed by the processing unit, wherein the plurality of modules comprises:

an image analyzing module to obtain characteristic values of a plurality of images of a scene captured by a pan-tilt-zoom (PTZ) camera;

a storing module to store the characteristic values of the plurality of images;

an image matching module to perform a fuzzy matching of two consecutive images of the plurality of images according to characteristic values of the two consecutive images, to obtain a corresponding area in both of the two consecutive images wherein the corresponding area in both the two consecutive images has a correlation degree of an autocorrelation of the characteristic values of the two consecutive images, the correlation degree is greater than a predetermined value;

a tracking module to determine a motion area with different characteristic values of the corresponding area in the two consecutive images, and obtaining position information of the motion area in the scene; and a drive module to receive the position information of the motion area, and adjust parameters of the PTZ camera, allowing the PTZ camera to shoot the motion area.

2. The system of claim 1, wherein the parameters of the PTZ camera comprise a shoot angle and a focal length.

3. The system of claim 1, wherein the characteristic values of the plurality of images are obtained by a fast Fourier transform of geometric, color, or texture characteristics of the plurality of consecutive images.

4. The system of claim 1, wherein a planar coordinate system having a horizontal axis and an ordinate axis is defined in the scene, with a center of the scene functioning as an origin of the planar coordinate system, the position information of the motion area comprises a coordinate range of the motion area in the scene, the coordinate range of the motion area indicating a shortest distance and a longest distance between the motion area and the origin of the planar coordinate system along a positive direction or a negative direction of each of the horizontal axis and the ordinate axis.

5. A motion detection method comprising:

receiving a first image and a second image of a scene which are captured by a pan-tilt-zoom (PTZ) camera successively, and calculating characteristic values of the first and second images;

storing the calculating characteristic values of the first and second images;

obtaining a corresponding area in both of the first image and the second image via a fuzzy matching of the first and second images according to the calculating characteristic values of the first and second images, wherein the fuzzy matching is performed via an autocorrelation of the characteristic values of the first and second images, the corresponding area is defined as an area appearing in both the first and second images and having a correlation degree of the characteristic values greater than a predetermined value;

determining a motion area with different characteristic values of the corresponding area in the first and second images, and obtaining position information of the motion area in the scene; and adjusting parameters of the PTZ camera according to the position information of the motion area, allowing the PTZ camera to shoot the motion area.

6. The method of claim 5, wherein the characteristic values of the first and second images are obtained by a fast Fourier transform of geometric, texture, or color characteristics of the first and second images.

7. The method of claim 5, wherein the motion area is obtained by accurately comparing the characteristic values of the corresponding area in both of the first and second images.

8. The method of claim 5, wherein a planar coordinate system having a horizontal axis and an ordinate axis is defined in the scene, with a center of the scene functioning as an origin of the planar coordinate system, the position information of the motion area comprises a coordinate range of the motion area in the scene.

9. The method of claim 8, wherein the coordinate range of the motion area comprises a horizontal coordinate range indicating a shortest distance and a longest distance between the motion area and the origin of the planar coordinate system along a positive direction or a negative direction of the horizontal axis, and a ordinate coordinate range indicating a shortest distance and a longest distance between the motion area and the origin of the planar coordinate system along a positive direction or a negative direction of the ordinate axis.

10. A motion detection method comprising:

receiving two consecutive images from a pan-tilt-zoom (PTZ) camera which continuously shoots a scene, and calculating characteristic values of the two consecutive images;

obtaining a corresponding area in both of the first image and the second image via a fuzzy matching of the first and second images according to the calculating characteristic values of the first and second images, wherein the fuzzy matching is performed via an autocorrelation of the characteristic values of the first and second images, the corresponding area is defined as an area appearing in both the first and second images and having a correlation degree of the characteristic values greater than a predetermined value;

determining a motion area with different characteristic values of the corresponding area in the two consecutive images; obtaining position information of the motion area in the scene; and adjusting the PTZ camera to be aimed to follow the motion area and obtain optimum focal length, according to the position information of the motion area.

11. The method of claim 10, wherein the position information of the motion area comprises a coordinate range of the motion area in the scene, the coordinate range is capable of indicating area of the motion area.

12. The method of claim 10, wherein the motion area is an area where a moving object is currently located.

* * * * *